United States Patent [19]

Burroughs

[11] 4,288,854
[45] Sep. 8, 1981

[54] BI-MODAL TEMPERATURE CONTROLLER

[75] Inventor: Mark S. Burroughs, Jonestown, Pa.

[73] Assignee: Western Electric Co., Inc., New York, N.Y.

[21] Appl. No.: 75,290

[22] Filed: Sep. 12, 1979

[51] Int. Cl.³ .................. G05D 23/19; F25B 29/00
[52] U.S. Cl. .................. 364/557; 165/26; 236/46 R; 364/105; 364/114
[58] Field of Search .............. 364/104, 105, 107, 114, 364/477, 557, 505, 501; 165/11-14, 26, 32; 236/46 R, 46 A, 46 C, 46 F, 47; 307/39

[56] References Cited

U.S. PATENT DOCUMENTS

| | | | |
|---|---|---|---|
| 3,301,481 | 1/1967 | Amy et al. | 236/46 |
| 3,566,091 | 2/1971 | Bay et al. | 364/477 X |
| 3,677,335 | 7/1972 | Weatherston | 165/12 |
| 3,709,289 | 1/1973 | Weatherston | 165/12 |
| 4,071,745 | 1/1978 | Hall | 165/11 X |
| 4,110,827 | 8/1978 | Shavit | 364/557 X |
| 4,184,067 | 1/1980 | Cress | 236/46 F X |

OTHER PUBLICATIONS

Tierstein, "Selecting Temperature Regulators and Controllers", *Instrumentation Technology*, Dec. 1978, pp. 52-59.

Primary Examiner—Joseph F. Ruggiero
Attorney, Agent, or Firm—G. W. Houseweart

[57] ABSTRACT

A temperature controller senses whether the temperature of a body (30) is higher or lower than a desired temperature, and then heats or cools the body (30) in either a high power mode or a low power mode. The controller operates in the low power mode if the elapsed time from the last change from heating to cooling or cooling to heating is less than a predetermined time interval. This condition typically occurs when the temperature of the body (30) is near the desired temperature, i.e., the controller is switching back and forth from heating to cooling in fairly short time intervals. If the elapsed time is longer than the predetermined time interval, as typically occurs when the temperature of the body (30) is being changed to a new desired temperature, the controller operates in the high power mode.

10 Claims, 6 Drawing Figures

BI-MODAL TEMPERATURE CONTROLLER

TECHNICAL FIELD

This invention relates to temperature controllers and more particularly to bi-modal temperature controllers.

BACKGROUND OF THE INVENTION

The control of temperature is both necessary and commonplace in industry; moreover, temperature controllers are used abundantly to regulate temperatures across a broad range of applications from controlling the temperature of a general working area to heating and cooling specific devices to temperature extremes.

The type of temperature control can be any one of a multiplicity of types as required for each application. For example, controlling the general air temperature of a circuit board assembly area would permit the use of a temperature controller of a type which has less sensitivity and less accuracy than a temperature controller used for controlling the temperature of a highly temperature sensitive process such as the controlled diffusion of impurities into semiconductor wafers. The term "accuracy" as used herein refers to the maximum temperature variation of a body while its temperature is regulated by a temperature controller.

An example of a particular application for a temperature controller is the testing of an electronic device which is inherently temperature sensitive, e.g., a semiconductor device such as an injection laser for use in an optical communication system. Since the device being tested is temperature sensitive, it is necessary to have a temperature controller which is relatively accurate. It is also often desirable to test the device at each of a plurality of temperatures to provide information about the operating characteristics of the device across a specific temperature range. In such cases, it is desirable for reasons relating to the cost of testing to move from one test temperature to the next in as short of a period of time as possible. Thus, a temperature controller with a fast response time is advantageous for this application. The term "response time" is used herein to refer to the time taken to change the temperature of a body from a first temperature to a second temperature and stabilize at that temperature such that variations about the second temperature are within a prescribed limit.

Unfortunately, these two requirements, i.e., accuracy and fast response time, are generally incompatable in a conventional type of temperature controller. In a conventional temperature controller, the heating or cooling element is turned fully on until a temperature sensor indicates that a temperature related to the desired temperature has been reached. Common household thermostats typically operate in this manner.

The incompatability arises between the two requirements of response time and accuracy. A high powered heating or cooling element provides fast temperature transition but also produces large overshoots and undershoots around the desired temperature, also referred to as the set point. These overshoots and undershoots of temperature either actually slow down the response time by requiring a relatively long time for the temperature variations to fall within the prescribed limits, or force the test to be less accurate since the temperature of the device is varying within a relatively wide range. Conversely, a low powered heating or cooling element provides a relatively high degree of accuracy, but provides a relatively long temperature transition period.

Several methods have been used in the past to provide a temperature controller which is relatively accurate and has a relatively fast response time. Generally these types of controllers are electronic proportional controllers. Proportional controllers provide variable power levels of heating or cooling in response to the differential between the actual temperature and the desired temperature. A large temperature differential results in high power levels of heating or cooling and a small temperature differential results in low power levels of heating and cooling. A problem with proportional controllers is that they tend not to reach the desired temperature since power levels decrease to the point that a body stabilizes at a temperature other than the set point due to heat lost to or gained from the background environment. Variations to the basic proportional controller have been made, and such types as the proportional-integral (PI) and proportional-integral-differential (PID) have been developed to compensate for the shortcomings of the basic proportional temperature controller.

Another problem with proportional controllers, in addition to that mentioned above, is that the more sophisticated proportional controllers such as the PI and PID types are relatively complex.

Thus, it can be appreciated that a temperature controller which is relatively simple and yet provides relatively accurate temperature controls and relatively fast response times is highly desirable.

SUMMARY OF THE INVENTION

It is, therefore, an object of this invention to provide a temperature controller which is relatively accurate and has a relatively fast response time.

It is also an object of this invention to provide a method for controlling the temperature of a body which can hold the temperature within a relatively narrow range of a desired temperature, and can change the temperature of the body from a first temperature to a second temperature and stabilize at the second temperature relatively quickly.

It is another object of this invention to provide a temperature controller that is relatively simple in construction.

To these and other ends an apparatus for controlling the temperature of a body in accordance with this invention includes a means for detecting whether the temperature of a body is above or below a desired temperature and for generating a digital status signal to indicate whether the body temperature is above or below the desired temperature. Timing means are included for determining whether the status signal has remained constant for a predetermined time interval.

The apparatus also includes means for generating at least a first and second pulse train, the first pulse train having a duty cycle which is less than the second pulse train. The first pulse train is coupled to a signal node when the timing means determines the status signal has not remained constant during the time interval, and the second pulse train is coupled to the signal node when the timing means determines that the status signal has remained constant during the time interval. Finally included are means for heating or cooling the body in response to the status signal and at a rate related to the duty cycle of the signal appearing at the signal node.

Also, in accordance with this invention, is a method for controlling the temperature of a body comprising the steps of generating a digital status signal for indicating whether the temperature of a body is above or below a desired temperature, timing a predetermined interval following each change of the status signal, and generating a first and second pulse train, the first pulse train having a duty cycle which is less than the duty cycle of the second pulse train.

The first pulse train is passed to a signal node when the time interval has not been completed, and the second pulse train is passed to the signal node after the time interval has been completed. The body is then heated or cooled in response to the status signal and at a rate related to the duty cycle of the signal appearing at the signal node.

BRIEF DESCRIPTION OF THE DRAWING

The aforementioned and other features, characteristics, advantages, and the invention in general, will be better understood from the following more detailed description taken in conjuction with the accompanying drawing in which.

Figure 1:
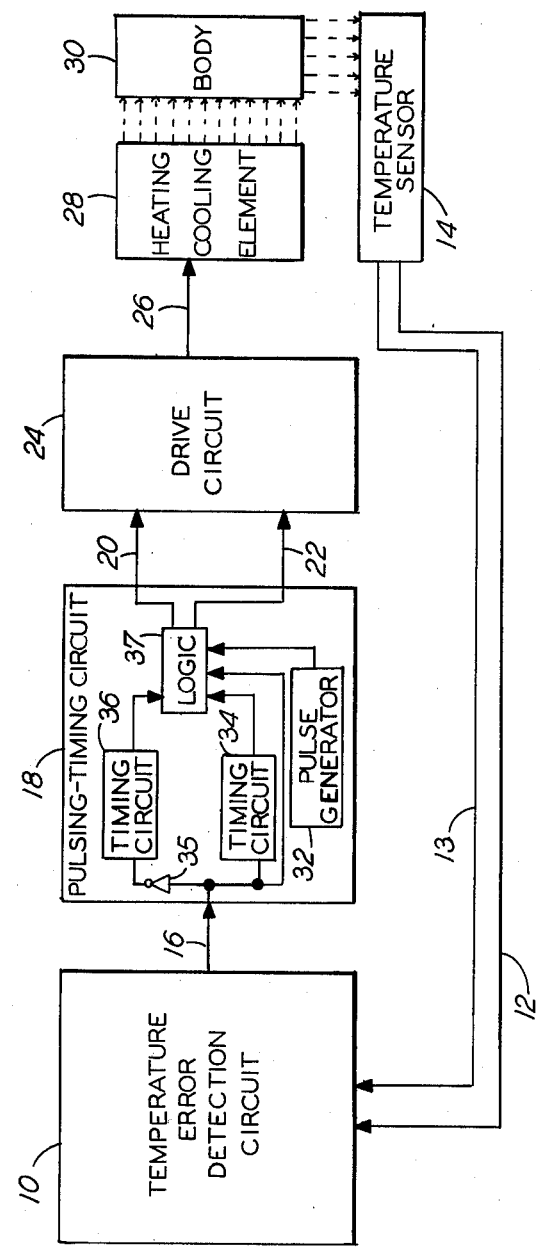
FIG. 1 is a block diagram of a bi-modal temperature controller in accordance with this invention.

It will be appreciated that for simplicity and clarity of explanation reference numerals have been repeated as considered appropriate in the figures to indicate corresponding features.

DETAILED DESCRIPTION

With reference now to the drawings, FIG. 1 shows a block diagram of a bi-modal temperature controller according to the present invention. A first block 10 represents a temperature error detection circuit which compares a feedback signal appearing on lines 12 and 13 with an internally generating signal. The signal on lines 12 and 13 is derived from a temperature sensor 14. The output of temperature error detection circuit 10 is a digital status signal which appears on line 16 and is an input to a pulsing-timing circuit 18. Pulsing-timing circuit 18 produces a pulsed output on one of two output lines 20 and 22 in response to the input on line 16 as described below.

The signals on lines 20 and 22 provide inputs to a drive circuit, shown as block 24. The output of circuit 24, on line 26, is used to drive a heating/cooling element, shown as block 28. The heating/cooling element either heats or cools a body, shown as block 30, in response to the signal appearing at line 26. Advantageously, the heating/cooling element of block 28 is in good thermal contact with body 30, which in turn is in good thermal contact with sensor 14, as indicated by the dotted lines connecting the blocks together.

Body 30 may be any device or substance, the temperature of which is to be controlled. In the preferred embodiment, for example, body 30 is an injection laser for use in optical communication systems. Injection lasers are temperature sensitive, and the temperature controller according to this invention allows a laser to be tested accurately and at a plurality of temperatures in a relatively short period of time.

In operation, temperature sensor 14 indicates the temperature of block 30 by varying the resistance between feedback lines 12 and 13 as a function of temperature. Temperature error detection circuit 10 compares the resistance between lines 12 and 13 with an internal resistance which represents a desired temperature for body 30. The result of the comparison is formed into a digital status signal appearing on line 16. In the preferred embodiment, the digital status signal is a high voltage level or digital state 1 when temperature sensor 14 indicates a temperature below the desired temperature, and is a ground potential voltage level or digital state 0 when temperature sensor 14 indicates a temperature above the desired temperature. However, it will be appreciated that the significance of the digital states could be reversed if desired by appropriate change of polarities in the circuit which will be described below with reference to FIG. 2.

Pulsing-timing circuit 18 in FIG. 1 has an internal pulse generator 32 which produces binary pulses, advantageously having a duty cycle of greater than fifty percent. That is, the positive pulses provided by pulse generator 32 each have a digital 1 level width which is greater than fifty percent of the period of the pulses. Also, the operating frequency of pulse generator 32 is advantageously at least an order of magnitude faster than the thermal response time of the system of FIG. 1 in order to avoid thermally pulsing body 30.

In addition to pulse generator 32, a pair of timing circuits 34 and 36 are also included in the pulsing-timing circit 18. The two timing circuits indicate whether the digital status signal on line 16 has remained uninterrupted on a high voltage level or low voltage level respectively for a predetermined period of time. A low to high transition of the digital status signal triggers timing circuit 34 to begin timing a predetermined interval. A high to low transition of the digital status signal, after inversion by an inverting gate 35, triggers timing circuit 36.

Those skilled in the art will understand that the function of timing circuits 34 and 36 may be provided by what are commonly termed one-shots or monostable multivibrators. During the interval that either timing circuit is timing, its output is a digital 1. However, when the predetermined time interval has passed uninterrupted or when the timing circuit is reset by the presence of a digital 0 at its input, the output of the timing circuit switches to a digital 0. Thus at any time during operation, one of the timing circuits 34 or 36 is in a reset condition.

The outputs of pulse generator 32 and timing circuits 34 and 36 of FIG. 1 are combined in logic circuitry 37 inside the pulsing-timing circuit 18 to produce, on lines 20 and 22, signals which are equal to the pulse train out of pulse generator 32 when either of the two timing circuits 34 or 36 have a digital 1 voltage level at its output. Or, stated another way, the signal appearing on lines 20 and 22 is a pulse train with a duty cycle of greater than fifty percent and having the same waveform as the pulses from generator 32 during the time, following each transition of the digital status signal on line 16, during which one of the timing circuits 34 or 36 of block 18 is timing its predetermined interval. Conversely, if either of timing circuits 34 or 36 times out its respective predetermined interval uninterrupted, i.e., without being retriggered or reset by a change in the digital status signal, the signal appearing on lines 20 or 22 is changed to a pulse train having the same polarity as, but the logical inverse of, the output of pulse generator 32, i.e., a series of binary pulses having a duty cycle of less than fifty percent.

A digital 0 signal on line 20 causes drive circuit 24 to place a positive voltage on line 26, which in turn causes heating/cooling element 28 to cool body 30. Logic inside pulsing-timing circuit 18 places a pulsing signal on line 20 only when the digital status signal on line 16 is at ground potential. Otherwise, line 20 is held at a digital 1 level. In a like manner, a digital 0 signal on line 22 causes drive circuit 24 to place a negative voltage on line 26 which in turn causes heating/cooling element 28 to heat body 30. Also, a pulsing signal is placed on line 22 only when the digital status signal on line 16 is at a high voltage level. Otherwise line 22 is held at a digital 1.

Since drive circuit 24 transforms the digital signals appearing on lines 20 and 22 to positive or negative voltages as described above, the duty cycle of the logical inversion of the signals on lines 20 and 22 is reflected into the duty cycle of the output of the drive circuit 24 on line 26. Thus a signal on lines 20 or 22 which has a duty cycle of greater than fifty percent provides less power for heating or cooling in the heating/cooling element of block 28 than would a signal on lines 20 or 22 with a duty cycle of less than fifty percent. Thus, a bi-modal temperature control results from the ability to place a pulse train on lines 20 or 22 which has a duty cycle of greater than fifty percent (low power mode) or less than fifty percent (high power mode).

In the preferred embodiment the predetermined time intervals of timing circuits 34 and 36 of pulsing-timing circuit 18 are selected long enough that the digital status signal on line 16 typically makes a transition from heating to cooling or cooling to heating before timing circuits 34 and 36 complete their timing intervals when the temperature of body 30 is close to the set point or desired temperature. In this manner, the temperature controller operates in a low power mode around the set point to provide temperature accuracy of ±0.1 degree Celsius. It will be apparent to those skilled in the art that the temperature of body 30 is constantly changing above and below the desired temperature, but that due to the low power of the temperature controller, these changes are relatively minor, on the order of less than 0.1° C.

When a new desired temperature is introduced into the temperature error detection circuit 10, the controller starts to move the temperature of body 30 toward the new desired temperature in the low power mode. However, usually the predetermined time interval is exceeded during the early part of the temperature transition, and the bi-modal temperature controller switches to the high power mode. The high power mode operates when a pulse train equal to the logical inverse of the output of pulse generator 32 is placed on the appropriate signal line 20 or 22. The high power mode allows the temperature controller to change the temperature of body 30 relatively rapidly. When the desired temperature is crossed, the temperature controller automatically switches to the low power mode (one of the timing circuits is retriggered and begins timing a new interval) and the overshoots an undershoots of temperature are advantageously damped out rapidly to provide a relatively fast response time.

Figure 2:
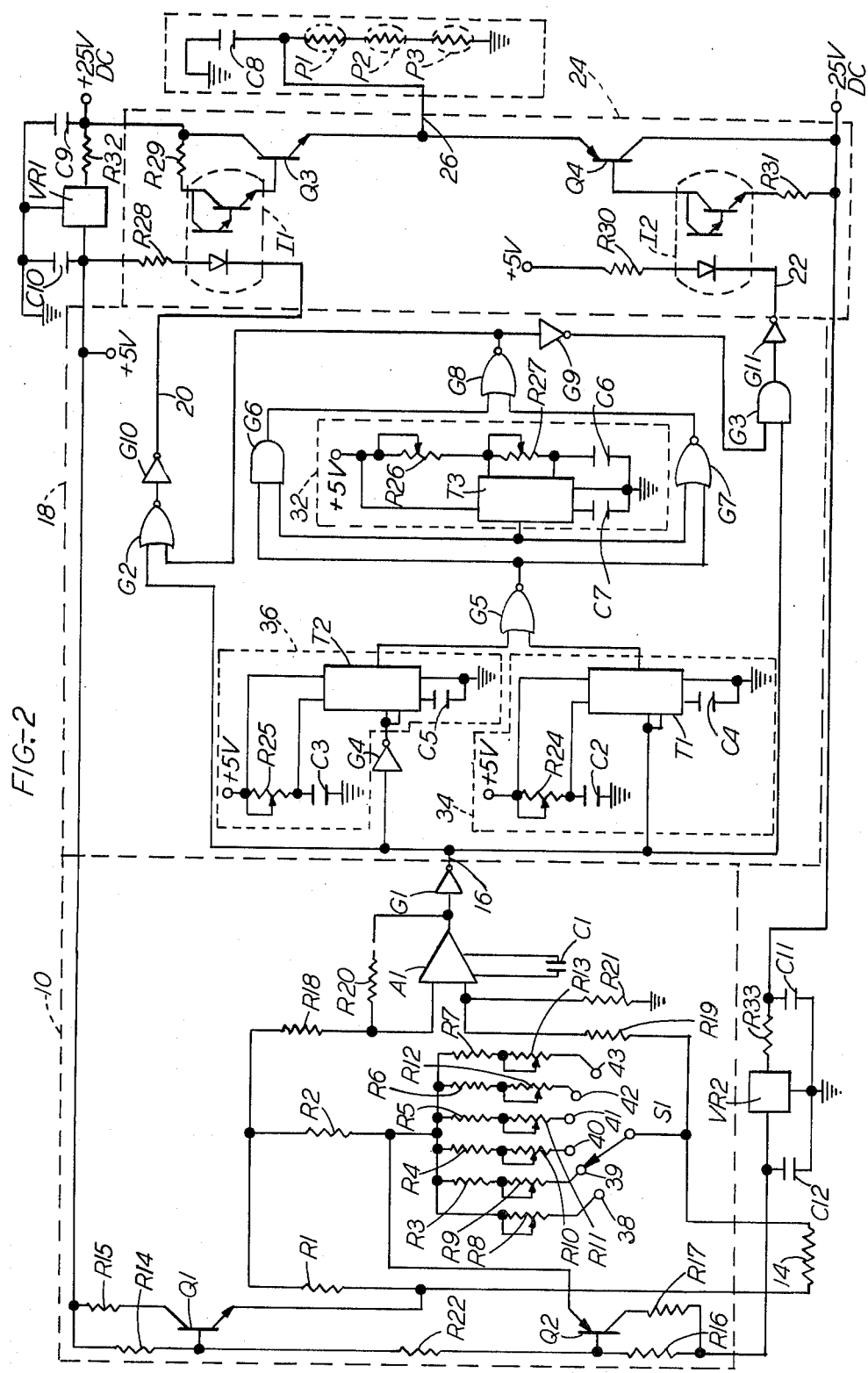
FIG. 2 is a detailed electrical schematic diagram of the temperature controller of FIG. 1.

Reference can now be had to FIG. 2, which is a detailed schematic circuit diagram of the temperature controller of FIG. 1. Temperature sensor 14 is a thermistor, which can be of a general type such as model GB 32P1 manufactured by Fenwel Electronics, Framingham, Mass. Temperature error detection circuit 10 includes a partial Wheatstone bridge circuit comprising thirteen resistors R1 through R13. Temperature sensor 14 completes the bridge.

A first current source, comprising two resistors R14 and R15 in conjunction with a transistor Q1 connected together in a configuration well known in the art, provides current to the top of the Wheatstone bridge at the common node of temperature sensor 14 and resistor R1. A second current source similar to the first current source and comprising two resistors R16 and R17 together with a transistor Q2 is connected to the bottom of the Wheatstone bridge at the common node of R2 and a selected one of series-combined resistors R3 and R9, R4 and R10, R5 and R11, R6 and R12, R7 and R13, or resistor R8, as selected by a switch S1. A resistor R22 connects the bases of transistors Q1 and Q2 together and operates in conjunction with resistor R14 and R16 to establish equal base currents in transistors Q1 and Q2.

A switch position 38, connected to variable resistor R8, is used to select a variable temperature setting, i.e., R8 is of a size such that the whole temperature range of interest can be covered by varying R8. A plurality of other switch positions 39 through 43 are connected to a series combination of a fixed resistor and a variable resistor and are designed to be pre-set for a given temperature. Thus switch positions 39 through 43 advantageously select particular pre-set temperature settings.

An operational amplifier A1 is coupled at two of its inputs through a pair of series resistors R18 and R19 to the middle nodes of the Wheatstone bridge, in a conventional manner. A feedback resistor R20, a balancing resistor R21 and a stabilizing capacitor C1 complete the external components locally associated with amplifier A1. Typical values for these components ma be 20 Mohms for resistors R20 and R21 and 100 picofarads for capacitor C1, where amplifier A1 is a model CA31305, available from RCA Corporation, Somerville, N.J.

The output of amplifier A1 is connected to the input of a logic gate inverter G1 having a Schmitt trigger input. The output of logic gate inverter G1 is the digital status signal.

During operation, temperature sensor 14 has a resistance which is a function of its temperature, and, accordingly, of the temperature of body 30. The two current sources supply a constant current to the Wheatstone bridge circuit, which current advantageously is designed to be low enough that temperature sensor 14 does not self-heat from the current flowing through it. Amplifier A1 amplifies the voltage imbalance across the bridge, caused by the inequality of the resistance of temperature sensor 14 and the resistance of the temperature set resistors. The bridge voltage is multiplied by a factor of approximately 1500 which usually causes the output of amplifier A1 to limit at either the positive or negative supply voltages. This high gain factor provides sharp voltage transitions at the output of amplifier A1. Almost all discontinuities on the output of A1 are smoothed out by the hysteresis input circuitry of logic gate G1. Thus the output of G1, the digital status signal, is an uncluttered stable digital signal. The output of logic gate G1 corresponds to line 16 of FIG. 1.

The circuit of block 10 is adapted such that if the temperature sensed by thermistor 14 is above the set point, amplifier A1 limits at the positive voltage, which is designed to be sufficiently above the threshold of Schmitt triggered gate G1 to produce a digital 0 status signal on line 16 to indicate the need for cooling. Alternatively, if the temperature sensed by thermistor 14 is below the set point, amplifier A1 limits at the negative voltage, causing gate G1 to produce a digital 1 status signal on line 16 to indicate the need for heating.

With reference now to broken-line rectangle 18 of FIG. 2, the digital status signal on line 16 is coupled directly into the input of timing circuit 34, into one input of a NOR gate G2 and into one input of an AND gate G3. The digital status signal is also logically inverted by an inverting gate 64 (gate 35 of FIG. 1) to form an inverted digital status signal which in turn is coupled into the input of timing circuit 36. Timing circuits 34 and 36 include timers T1 and T2 configured to operate as monostable multivibrators and are of a type such as device type SE555 as manufactured by Texas Instruments, Dallas, Tex. The inputs to timers T1 and T2 are connected to both the trigger input and the reset input to provide the reset operation described above. A variable timing resistor R24 and timing capacitor C2 are associated with timer T1. Similarly, a variable timing resistor R25 and timing capacitor C3 are associated with timer T2. Additional capacitors C4 and C5 provide operational stability to timers T1 and T2, respectively.

The outputs of timing circuits 34 and 36 are each coupled to one input of a NOR gate G5, the output of which is connected to one input of an AND gate G6 and one input of a NOR gate G7. A second input to AND gate G6 and NOR gate G7 comes from pulse generator 32. The pulse generator in the preferred embodiment uses a third timer T3 configured to operate as an astable multivibrator. Timer T3 in the preferred embodiment is the same type of device as timers T1 and T2. Variable timing resistors R26 and R27, together with timing capacitor C6, are associated with timer T3 in a conventional manner to determine the pulse width and repetition rate from pulse generator 32. An additional capacitor C7 provides operating stability to timer T3.

The output of AND gate G6 and the output of NOR gate G7 are coupled to separate inputs of another NOR gate G8. The output of NOR gate G8 is coupled to a second input of NOR gate G2 and to the input of an inverter gate G9. The output of inverter gate G9 is coupled to a second input of AND gate G3. The output of NOR gate G2 is inverted by an inverting gate G10 to form the first output, shown as line 20 in FIG. 1 of pulsing-timing circuit 18. The output of AND gate G3 is inverted by an inverting gate G11 to form the second output, shown as line 22 in FIG. 2 of pulsing-timing circuit 18.

In operation, a low to high transition of the digital status signal on line 16 triggers timing circuit 34. At this time the output of timing circuit 34 goes to a positive voltage (digital 1 level) for a period of time as determined by variable timing resistor R24 and timing capacitor C2. In the preferred embodiment of the invention, the time period for timing circuit 34 is in the range of ten to twenty seconds. During the timing interval the output of timing circuit 34 stays positive, and returns to essentially ground potential after either the completion of the timing interval or a change in the digital status signal to a digital 0 which resets timing circuit 34. Timing circuit 36 is adjusted to operate in the same manner and with essentially the same time period as timing circuit 34. However, timing circuit 36 is triggered by high to low transitions of the digital status signal due to the operation of inverting gate G4 and is reset by a digital 1 level of the digital status signal. In view of the above-indicated timing intervals, it will be appreciated that 250 Kohm variable resistor may be used for R24 and R25 and 100 microfarad capacitors may be used for capacitors C2 and C3.

The output of timing circuits 34 and 36 are OR'd together and inverted by NOR gate G5. The output of NOR gate G5 is therefore normally a digital 1 and switches to a digital 0 for a time period of at least ten to twenty seconds following each transition of the digital status signal.

Timer T3 is configured to operate as a pulse generator advantageously producing positive pulses having a width or duty cycle of approximately seventy percent of each period and a pulse repetition rate on the order of one kilohertz in the preferred embodiment. To produce these conditions, R26 and R27 may be 10 Kohm variable resistors and capacitors C6 may be 0.1 microfarads. Stabilizing capacitors C4, C5 and C7 may be about 0.01 microfarads.

The output of pulse generator 32 is combined with the output of NOR gate G5 by logic gates G6, G7, G8 in a manner known in the art to produce an Exclusive-OR function. Thus the output of NOR gate G8 is the Exclusive OR of the output of pulse generator 32 and the output of NOR gate G5. Stated another way, the output of NOR gate G8 is the same as the output of pulse generator 32 when the output of NOR gate G5 is a digital 0, and the logical inverse of the output of pulse generator 32 when the output of NOR gate G5 is a digital 1.

The output of NOR gate G8 is gated to the first output line 20 by gates G2 and G10 when the digital logic signal on line 16 is a digital 0. Otherwise, the output of logical inverting gate G10 is a positive voltage equal to a digital 1. Analogously, the output of NOR gate G8 is gated to the second output of pulsing-timing circuit 18 on line 22 by gates G3 and G11 when the digital status signal on line 16 is a positive voltage equal to a digital 1. Otherwise the output of logical inverting gate G11 is a digital 1 level.

The driver circuit block 24 of FIG. 1 is also shown in detail in FIG. 2. Two optical isolation devices I1 and I2 are contained in driver circuit block 24, together with four bias resistors R28, R29, R30 and R31, an NPN power transistor Q3 and a complementary PNP power transistor Q4. Line 20 from pulsing-timing circuit 18 is connected to the cathode of the light emitting diode (LED) of optical isolation device I1. The anode of the LED is coupled through resistor R28 to a +5 VDC supply. Similarly, line 22 from pulsing-timing circuit 18 is connected to the cathode of the LED of optical isolation device I2, and the anode of the LED is coupled through resistor R30 to a +5 VDC supply.

The collectors of the Darlington transistors of optical isolation device I1 are coupled through resistor R29 to a +25 VDC supply voltage. The emitter of the second stage transistor of the Darlington transistor pair of device I1 is coupled to the base of NPN power transistor Q3. The collector of transistor Q3 is also coupled to the +25 VDC supply voltage.

The emitter of the second stage transistor of the Darlington transistor pair of optical isolation device I2 is coupled through resistor R31 to a −25 VDC supply voltage. The collectors of the Darlington pair are coupled together and to the base of PNP power transistor Q4. The collector of PNP power transistor T4 is also coupled to the −25 VDC supply voltage.

The emitters of the NPN and PNP power transistors are coupled together and to line 26 which connects the output of driver circuit 24 to a first end of a filter capacitor C8, and to a first end of three thermoelectric coolers P1, P2, and P3 in series. The other end of capacitor C8 and the other end of the series combination of thermoelectric coolers P1, P2 and P3 are coupled to ground. Thermoelectric coolers P1, P2, P3 in the preferred embodiment are advantageously solid state devices which utilize the Peltier effect to transfer heat from one surface to another, as is known in the art. Coolers suitable for use in the preferred embodiment are the Model No. 950-70 from the Borg-Warner Corporation, Chicago, Ill.

In operation, a low voltage of essentially ground potential on either one of lines 20 or 22 allows current to flow through the corresponding LED of optical isolation devices I1 and I2, respectively. Current through either one of these LEDs causes the respective phototransistors to conduct, which in turn provides base drive to the respective power transistor. Thus, a low voltage out of inverting gate G10 causes NPN power transistor Q3 to turn on, which places essentially 25 volts onto line 26. Similarly, a low voltage out of inverting gate G11 causes PNP power transistor Q4 to turn on, which places essentially −25 volts onto line 26. It will be understood that due to the nature of the logic in the pulsing-timing circuit 18, power transistor Q3 and Q4 will not be on at the same time.

It should be appreciated that because power transistors Q3 and Q4 provide drive current to coolers P1–P3 when lines 20 or 22 are low, these coolers are operated at a duty cycle which is the logical inverse of the duty cycle appearing on lines 20 and 22. It should also be appreciated that power transistors Q3 and Q4 operate generally in either saturation or cutoff mode. Thus the power being dissipated by each transistor is minimized. Stated another way, while power transistors Q3 and Q4 must be capable of switching relatively high currents, e.g., on the order of six amps in the preferred embodiment, they do not have to be able to dissipate power in the tens of watts range.

Two voltage regulators VR1 and VR2, e.g., Model MC7805 and MC7905, Motorola, Phoenix, Ariz., provide +5 VDC and −5 VDC, respectively. Capacitors C9 and C10 provide filtering of the +25 VDC line and +5 VDC line, respectively. Similarly, capacitors C11 and C12 are filters for the −25 VDC line and the −5 VDC line, respectively. Resistor R32 and R33 are included simply to drop voltage between the positive and negative 25 volt lines and regulators VR1 and VR2, and thereby dissipate power which would otherwise have to be absorbed by regulators VR1 and VR2.

Reference can now be had to FIGS. 3–6 in conjunction with FIG. 2 with regard to the following discussion of the overall operation of the temperature controller. FIGS. 3–6 show the approximate voltage waveforms at line 26 for four operating conditions. The waveforms are approximate for instructional purposes. It will be understood by those skilled in the art that capacitor C8 tends to round the corners of the waveforms.

The steady state operation of the temperature controller around the set point or desired temperature is one of alternating between a heating and a cooling condition with a frequency such that typically a transition is made from one condition to the next before timing circuit 34 or 36 completes a full timing period. In that mode, the output of at least one of the timing circuits 34 or 36 is always high. As a result the output of NOR gate G5 is always low, causing the output of NOR gate G8 to be of the same form as the output of the pulse generator, e.g., a pulse train having a duty cycle of approximately 70%.

Figure 3:
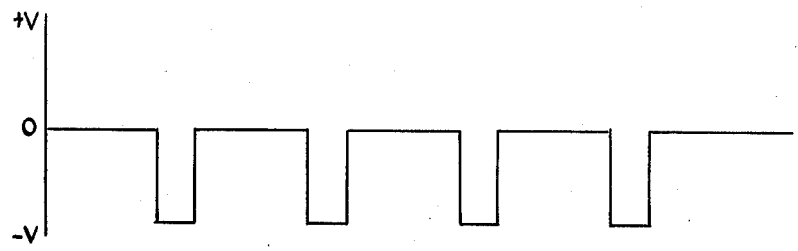
FIGS. 3-6 are graphical representations of the approximate voltages appearing at an output terminal of the temperature controller of FIG. 1 for different operating conditions.
Figure 4:
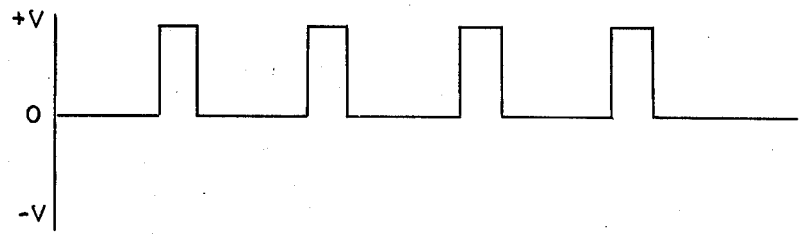
Figure 5:
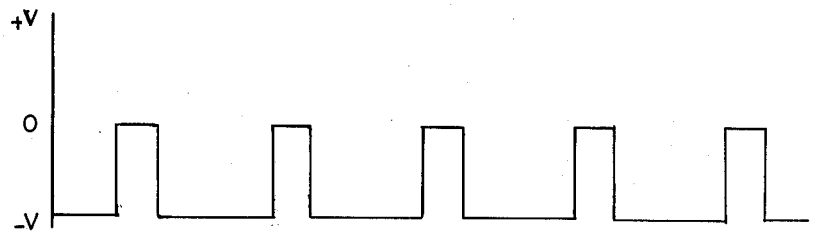

Because of the logical inversion produced by isolators I1 and I2, as discussed above, the logical inverse of the duty cycle of the signal out of NOR gate G8 controls the duty cycle of either transistor Q3 (cooling condition) or Q4 (heating condition). Thus the voltage on line 26 switches from ground potential to approximately +25 V depending on the conditions of the temperature controller (heating or cooling) and with a duty cycle of approximately 30%, which is the logical inverse of the duty cycle of the pulse generator 32. This mode of operation is referred to as the low power mode. FIGS. 3 and 4 are a representation of the voltage on line 26 during a low power mode heating condition and a low power mode cooling condition respectively. As can be seen the dwell times at either a +V or −V are approximately 30% of the total time. Thus the thermoelectric cooling device is receiving approximately 30% of the full ON power in the low power mode.

The temperature controller generally switches to the high power mode soon after a new set point or desired temperature is selected in the temperature error detection circuitry 10. As an example, if the set point is set to a higher temperature, the temperature controller will either remain in or switch to the heating condition in the low power mode. At the time switch S1 is moved to a position corresponding to a temperature higher than the temperature of the thermistor 14, amplifier A1 drives gate G1 to switch to a digital 1 status signal on line 16, or to remain at a digital 1 level if the temperature controller is presently in a heating condition, indicating the need for heating by devices P1–P3 and thereby either triggering timing circuit 34 to begin to time a new period, or permitting timing circuit 34 to continue timing uninterrupted.

Assuming the set point has been adjusted enough over the previous temperature, the temperature of body 30 will not reach the set point before timing circuit 34 finishes timing its interval (on the order of ten to twenty seconds). Since timing circuit 36 is in the reset condition, because its input is a digital 0, the outputs of timing circuits 34 and 36 will both be low, forcing the output of NOR gate G5 to a digital 1 level. This will in turn place the logical inverse of the output of the pulse generator on the output of NOR gate G8. The logical inverse of the output of the pulse generator is a positive pulse having a duty cycle of approximately 30%.

Since the bases of transistors Q3 and Q4 are enabled by a logical inverse of the signal on the output of NOR gate G8 during heating and cooling as appropriate, transistor Q4 will conduct approximately 70% of the time, and be nonconducting for the remainder. Thus the voltage appearing at line 26 will be approximately that shown in FIG. 5. This mode of operation is referred to as the high power mode; the thermoelectric cooler is receiving 70 percent of the maximum power, or more than twice as much power as during the low power mode of operation.

Figure 6:
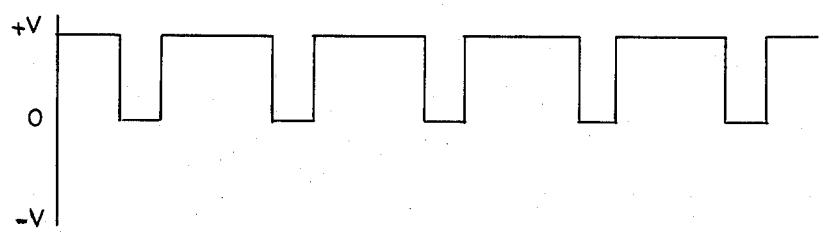

Of course, the operation of the temperature controller when a new set point is selected which is lower than the present temperature of body 30 is analogous, producing a voltage waveform at line 26 during the high power mode as shown approximately by FIG. 6.

When the temperature of body 30 reaches the new set point, the temperature controller, by sensing that the temperature of body has exceeded the set point, changes from one condition to the other condition (e.g., from heating to cooling). This is caused by a change in the state of the digital status signal, which in turn triggers one of the timing circuits 34 or 36. When either timing circuit 34 or 36 begins timing again, the output of NOR gate G5 goes low and the temperature controller switches to the low power mode. In this manner the temperature controller can diminish the amount of temperature undershoot and overshoot to come within the required limits of temperature excursions in a rapid manner.

Thus the bi-modal temperature controller is able to combine accuracy with a relatively fast response time. Also, all of the necessary components, with the possible exception of the thermoelectric coolers, are well known, readily available, and relatively inexpensive. Finally, the overall circuit is relatively simple and inexpensive to manufacture.

Although the invention has been described in part by making detailed reference to a specific embodiment, such detail is intended to be and will be understood to be instructive rather than restrictive. It will be appreciated by those in the art that many variations may be made in the structure and mode of operation without departing from the spirit and scope of the invention, as disclosed in the teachings contained herein. For example, the duty cycle of the pulse generator in the preferred embodiment can be adjusted to provide a larger or smaller power ratio between the low power mode and the high power mode.

Those skilled in the art will appreciate that although the preferred embodiment can either heat or cool, it would be also possible to build a temperature controller according to the teachings of this invention which had the capability to heat only or cool only. Also, it is considered within the skill of the art to modify the bi-modal temperature controller to a multi-modal temperature controller by providing additional pulse generators and timers so that the temperature controller can operate at and shift through a plurality of power levels. Further, although the high power mode and low power mode pulse trains are the logical inverse of each other, being derived from a single pulse generator, it will be understood by those skilled in the art that two separate pulse generators could be utilized to establish the high power mode and low power mode pulse trains.

Further, of course, it will be understood that the timing intervals of timing circuits 34 and 36 do not have to be constant, but could be varied in length depending on conditions such as the relative efficiency of the heating or cooling element at a given temperature.

Still further, of course, it will be understood that the temperature sensor 14 need not be a thermistor, although such is considered advantageous in the preferred embodiment, but could be any of a variety of sensors, such as a thermocouple. In such cases of course the detection circuit 10 would be altered to account for the particular output of the selected sensor.

And finally, of course, it will be appreciated that the heating/cooling element(s) need not be thermoelectric coolers, although such are considered advantageous in the preferred embodiment, but rather may be selected from among the great variety of alternate heating devices and cooling devices available, depending upon preference and the particular application involved.

What is claimed is:

1. Apparatus for controlling the temperature of a body comprising:
    (a) means for detecting whether the temperature of the body is greater than or less than a desired temperature and for generating a status signal to indicate whether the body temperature is greater than or less than said desired temperature;
    (b) timing means for determining whether said status signal has remained constant for a predetermined time interval;
    (c) means for generating at least a first and second pulse train, said first pulse train having a duty cycle which is less than the duty cycle of said second pulse train;
    (d) means for coupling said first pulse train to a signal node when said timing means determines that said status signal has not remained constant during said time interval, and for coupling said second pulse train to said signal node when said timing means determines that said status signal has remained constant during said time interval; and
    (e) means for heating or cooling said body in response to said status signal and at a power level related to the duty cycle of the signal coupled to said signal node.

2. Apparatus as recited in claim 1 wherein said status signal is a digital signal.

3. Apparatus as recited in claim 2 wherein said timing means includes means responsive to a change in said status signal for producing at an output a first digital signal indicating the initiation of timing said predetermined interval, for maintaining said first digital signal at said output prior to expiration of said predetermined interval, and for producing at said output a second digital signal indicating the expiration of said predetermined interval.

4. Apparatus as recited in claim 3 wherein said coupling means includes means responsive to said status signal and to the output of said timing means for:
    (i) coupling the first pulse train to the heating means in response to the first digital signal and to an indication by the status signal that the body temperature is less than the desired temperature;
    (ii) coupling the second pulse train to the heating means in response to the second digital signal and to an indication by the status signal that the body temperature is less than the desired temperature;
    (iii) coupling the first pulse train to the cooling means in response to the first digital signal and to an indication by the status signal that the body temperature is greater than the desired temperature; and
    (iv) coupling the second pulse train to the cooling means in response to the second digital signal and to an indication by the status signal that the body temperature is greater than the desired temperature.

5. Apparatus as recited in clam 1 wherein said timing means includes first means for timing a first predetermined interval in response to a change in status signal from a digital 1 to a digital 0 and second means for timing a second predetermined interval in response to a change in status signal from a digital 0 to a digital 1.

6. Apparatus as recited in claim 5, further including means responsive to said first means and to said second means for indicating whether either of said first means or said second means is timing an interval.

7. Apparatus as recited in claim 1 wherein said first pulse train is the logical inverse of said second pulse train.

8. Apparatus as recited in claim 1 wherein said power level is proportional to the duty cycle of the signal coupled to said signal node.

9. A method for controlling the temperature of a body comprising the steps of:
   (a) generating a digital status signal which indicates whether the temperature of the body is greater than or less than a desired temperature;
   (b) timing an interval following each change of said digital status signal;
   (c) generating a first pulse train and a second pulse train, said first pulse train having a duty cycle which is less than the duty cycle of said second pulse train;
   (d) passing said first pulse train to a signal node prior to expiration of the time interval;
   (e) passing said second pulse train to said signal node after expiration of the time interval; and
   (f) heating or cooling the body in response to said digital status signal and at a rate related to the duty cycle of the signal appearing at said signal node.

10. A method for controlling the temperature of a body as set forth in claim 9 wherein said first and second pulse trains are generated by establishing said second pulse train and logically inverting said second pulse train to form said first pulse train.

* * * * *

UNITED STATES PATENT AND TRADEMARK OFFICE
CERTIFICATE OF CORRECTION

PATENT NO. : 4,288,854
DATED : September 8, 1981
INVENTOR(S) : MARK S. BURROUGHS It is certified that error appears in the above—identified patent and that said Letters Patent is hereby corrected as shown below:

Column 6, line 2, "Fenwel" should read --Fenwal--;
              line 37, "ma" should read --may--;
              line 37, "20" should read --20M--;
              line 38, "Mohms" should read --ohms--.
    Column 8, line 6, "250 Kohm" should read --250K ohm--;
              line 6, "resistor" should read --resistors--;
              line 20, "10 Kohm" should read --10K ohm--;
              line 21, "capacitors" should read --capacitor--.
    Column 10, line 15, "+25V" should read --±25V--.

Signed and Sealed this

Eighth Day of December 1981

[SEAL]

Attest:

GERALD J. MOSSINGHOFF

Attesting Officer     Commissioner of Patents and Trademarks